United States Patent [19]

Howard et al.

[11] Patent Number: 5,734,820
[45] Date of Patent: Mar. 31, 1998

[54] SECURITY APPARATUS AND METHOD FOR A DATA COMMUNICATIONS SYSTEM

[75] Inventors: Ricky D. Howard, Victorville; Ramzi Khaouli, Orange, both of Calif.

[73] Assignee: Sterling Commerce, Inc., Dallas, Tex.

[21] Appl. No.: 647,425

[22] Filed: Mar. 11, 1996

[51] Int. Cl.$^6$ .................. G06F 15/16; H04L 9/00
[52] U.S. Cl. .................. 395/186; 395/187.01
[58] Field of Search .................. 395/186, 187.01, 395/188.01, 200.06, 200.09, 492, 493, 494, 495, 496; 380/4, 24, 25

[56] References Cited

U.S. PATENT DOCUMENTS

| | | | |
|---|---|---|---|
| 4,396,983 | 8/1983 | Segara et al. | 395/200.03 |
| 4,430,728 | 2/1984 | Beitel et al. | 395/95 |
| 4,486,828 | 12/1984 | Kitamura et al. | |
| 4,500,960 | 2/1985 | Babecki et al. | 395/280 |
| 4,766,542 | 8/1988 | Pilarczyk | 364/413 |
| 5,191,611 | 3/1993 | Lang | 380/25 |
| 5,381,534 | 1/1995 | Shi | 395/706 |

*Primary Examiner*—Ly Hua
*Attorney, Agent, or Firm*—Baker & Botts, L.L.P.

[57] ABSTRACT

A data communication system includes a host (12) having a memory and a remote (16) that communicate data. A security system (14) is coupled to the remote (16) and the host (12), and spawns an interactive process in response to the remote (16) requesting access to the host (12). The interactive process has selected access to the memory of the host (12), and interacts with the remote (16) to provide the selected access. The security system (14) may include a communications module (50), a control module (60), a mailbox module (62), an auto connect module (64), a log module (66), and an exits module (68).

27 Claims, 7 Drawing Sheets

SECURITY APPARATUS AND METHOD FOR A DATA COMMUNICATIONS SYSTEM

TECHNICAL FIELD OF THE INVENTION

This invention relates in general to the field of data communications systems, and more particularly to a security apparatus and method for a data communications system.

BACKGROUND OF THE INVENTION

Many data communication systems include a collection of interconnected devices, which may include a host and a plurality of remotes. Multiple users may desire access to the processing and storage capabilities of these systems. For example, a user of a remote may access the processing and storage capabilities of the host using an electronic mailbox.

As data communications systems become larger and more complex to serve a variety of users, system administrators may desire to limit access to the processing and storage capabilities of the system according to the needs and authorization of a particular user. A known security technique allows users unlimited access to processing and storage capabilities of a host upon furnishing appropriate access information, such as an identifier and a password. However, unauthorized users may thwart this security technique by appropriating the access information. Further, once a user has accessed the host, whether authorized or not, the user may have unlimited access to the processing and storage capabilities of the host.

SUMMARY OF THE INVENTION

In accordance with the present invention, the disadvantages and problems associated with security in a data communications system have been substantially reduced or eliminated.

In accordance with one embodiment of the present invention, a data communication system includes a remote that communicates data. A host having a memory is coupled to the remote and communicates data with the remote. A security system is coupled to the remote and the host, and spawns an interactive process in response to the remote requesting access to the host. The interactive process has selected access to the memory of the host, and interacts with the remote to provide the selected access.

In another embodiment of the present invention, a method of initializing a data communications system includes invoking a plurality of non-control modules operable to determine a well-known port number for a control module, communicating the ephemeral port numbers for the non-control modules to the control module using the well-known port for the control module, and communicating a ready signal from the control module to each of the non-control modules, the ready signal having the ephemeral port numbers for each of the non-control modules.

Important technical advantages of the present invention include providing a security apparatus and method that associates a data repository within the memory of the host with a user, and limits the user's access to the memory of the host to access to the user's associated data repository. Access to the data repository associated with the user may be specified and approved according to access information associated with the particular user. The data repository associated with the user is isolated from data repositories associated with other users, such that each user's access to the memory of the host is limited to access to the particular user's associated data repository. The present invention is therefore able to service a number of users simultaneously and without conflict, while providing security for the memory of the host.

Another important technical advantage includes providing a security apparatus and method that may be distributed to operate on a number of different processing platforms to provide increased portability, modularity, and adaptability. Further technical advantages of the present invention include a mailbox module that spawns a separate interactive process for each user that accesses the system, a communications module that receives communications from users in a number of different protocols, and an auto connect module that initiates communications between the system and a user at predetermined times. Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
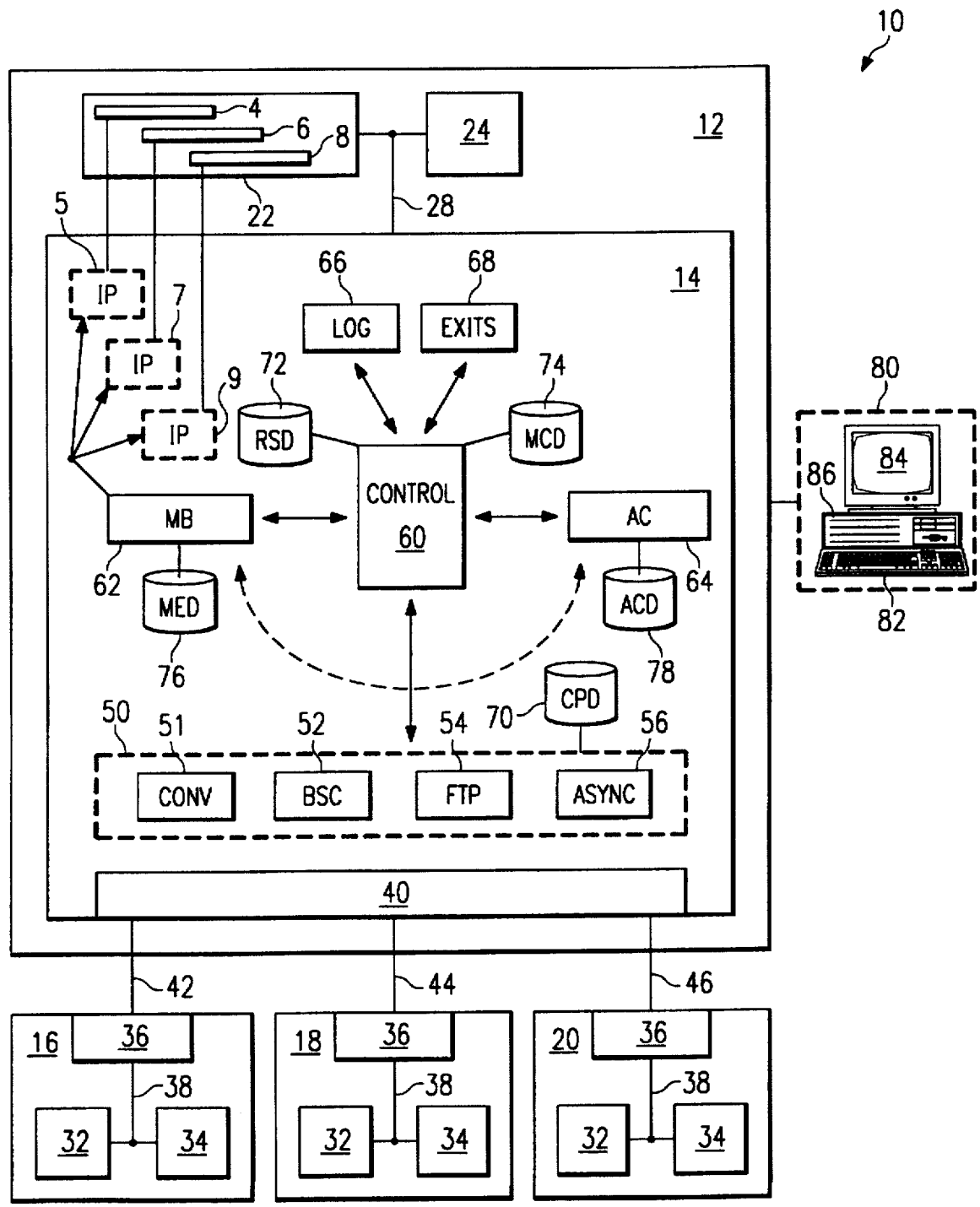
FIG. 1 illustrates a data communication system.

FIG. 1 illustrates a data communication system 10 that includes a host 12, a security system 14 running on host 12, and a plurality of remotes 16, 18, and 20. In one embodiment, host 12 is a mainframe computer, mini-frame computer, personal computer, or other processing device having data processing and storage capabilities. In general, system 10 manages access by remotes 16, 18, and 20 to the processing and storage capabilities of host 12.

Host 12 comprises a memory 22 and a processor 24 that together operate to store, process, or manipulate data. Memory 22 and processor 24 are coupled to security system 14 using link 28. Generally, host 12 may be any processing device coupled to any suitable wireline or wireless link to communicate data with other processing devices. In one particular embodiment, host 12 comprises a mainframe computer operable to communicate data using the IBM 3770 data communications protocol.

Memory 22 may be any suitable memory, such as dynamic or static random access memory (RAM), read only memory (ROM), magnetic media, optical media, CD-ROM, or other suitable volatile or non-volatile storage media. Memory 22 stores information in files, directories, or any other suitable arrangement that may be accessed by security system 14 and processor 24. Memory 22 contains instructions for processor 24 to execute in managing the operation of security system 14. Memory 22 also contains data repositories 4, 6, and 8 operable to store data associated with the plurality of remotes 16, 18, and 20, respectively. Data repositories 4, 6, and 8 are accessible to remotes 16, 18, and 20 using security system 14 and processor 24.

In general, remotes 16, 18, and 20 may be any logical entities in hardware and/or software that desire access to the processing and storage capabilities of host 12. Remotes 16, 18, and 20 each include a memory 32 and a processor 34 that together operate to store, process, or manipulate data. Memory 32 and processor 34 of remotes 16, 18, and 20 are coupled to an interface 36 using link 38. Interfaces 36 for remotes 16, 18, and 20 couple to interface 40 of security system 14 using links 42, 44, and 46, respectively.

Generally, remotes 16, 18, and 20 may be any processing device coupled to any suitable wireline or wireless link 42, 44, and 46, respectively, to communicate data with other processing devices. For example, remotes 16, 18, and 20 may be miniframes or personal computers and links 42, 44, and 46, respectively, may communicate data using FTP, ASYNC, BISYNC, TCP/IP, SLIP, SDLC/SNA, X.25, X.400, or any other suitable communications protocol. For example, the ASYNC family of protocols may include specific implementations, such as XMODEM, YMODEM, ZMODEM, KERMIT, or other standards of asynchronous data communications. A protocol is generally any format, definition, or specification for the communication of data, whether implemented in software, hardware, or both software and hardware. A protocol may include, without limitation, transmission rates, frame formats, blocking formats, text formats, stop/start indicators, framing and heading indicators, field definitions, checksum values, carriage return and line feed (CR/LF) indicators, and any other suitable information that specifies the content or nature of the communicated data.

As described above, security system 14 operates on host 12 and is coupled to remotes 16, 18, and 20 using interface 40. In a particular embodiment, interface 40 comprises one or more Emulex DCP 286 boards, serial board/ports, or TCP/IP network interfaces suitable to support BISYNC, ASYNC, FTP or other communications protocol between remotes 16, 18, and 20 and security system 14. Interface 40 is coupled to and interacts with the communications module 50 of security system 14.

Although security system 14 is shown as integral to host 12, security system 14 may be integral to or separate from host 12. Security system 14 may operate on one or more computers associated with host 12. A computer 80 operating in association with host 12 may include an input device 82, such as a keypad, touch screen, or other device that can accept information. An output device 84 may convey information associated with the operation of security system 14, including digital or analog data, visual information, or audio information. Both input device 82 and output device 84 may include fixed or removable storage media, such as a magnetic computer disk, CD-ROM, or other suitable media to both receive output from and provide input to security system 14. Computer 80 may have a processor 86 and an associated volatile or nonvolatile memory execute instructions and manipulate information in accordance with the operation of security system 14.

Security system 14 establishes and conducts communications sessions using communications subsystem 50, which allows host 12 and remotes 16, 18, and 20 to exchange data. Host 12 and remotes 16, 18, and 20 may operate using different communications protocols. Communications subsystem 50 may include a plurality of communications modules 52, 54, and 56. Each communications module 52, 54, and 56 may have an associated protocol for establishing and conducting communications sessions with any of the remotes 16, 18, and 20 that operate using that particular associated protocol.

Although communications subsystem 50 includes communications modules 52, 54, and 56 associated with bisynchronous, file transfer, and asynchronous protocols, respectively, the present invention contemplates as many communications modules as desired to allow the plurality of remotes 16, 18, and 20 to effectively communicate data with host 12. In one embodiment, communications subsystem 50 includes a protocol converter 51 that receives first data from remote 16 in a first protocol, translates the first data into second data in a second protocol, and communicates the second data to host 12 in the second protocol. U.S. patent application Ser. No. 08/582,536 entitled "Protocol Converter Apparatus and Method," filed by Sterling Commerce, Inc., describes a suitable protocol converter, and is herein incorporated by reference.

Communications subsystem 50 is coupled to communications port definitions files (CPD) 70. In one embodiment, each CPD 70 supports a different communications protocol and is associated with a different communications module 52, 54, or 56. Each CPD 70 contains protocol-oriented coordination information for protocol-dependent communications between each remote 16, 18, or 20 and its associated communications module 52, 54, or 56. CPD 70 may, for example, specify the communications resources, including ports and devices, associated with communications modules 52, 54, and 56, respectively, and the manner in which communications modules 52, 54, and 56 may communicate with those communications resources. CPD 70 may include, without limitation, communications module start-up options, communications port identifiers and initialization rates, path specifications, server information, modem information and identifiers, communications hardware information, bisynchronous emulation specifications, line switching specifications, inbound and outbound data block-size specifications, maximum inactivity interval settings, asynchronous interactivity mode settings, sign-on and password prompts, and any other information suitable for supporting protocol-dependent communications between communications modules 52, 54, and 56 and remotes 16, 18, and 20.

Control module 60 is coupled to and coordinates communications between communications subsystem 50, mailbox module 62, auto connect module 64, log module 66, and exits module 68. Control module 60 manages the operation of security system 14 by providing remotes 16, 18, and 20 selected access to the processing and storage capabilities of host 12. The processing and storage capabilities of host 12 include memory 22 and processor 24. Mailbox module 62 manages the communication of data to and from the data repositories 4, 6, and 8. Auto connect module 64 initiates communications between host 12 and remotes 16, 18, and 20. Log module 66 stores status information generated by system 10. Exits module 68 implements a plurality of user-supplied exits before and during a data communications session between remotes 16, 18, and 20 and host 12. In one embodiment, communications subsystem 50, control module 60, mailbox module 62, auto connect module 64, log module 66, and exits module 68 operate as separate processes running on host 12 to provide selected access to the processing and storage capabilities of host 12.

Control module 60 is coupled to remote site definition files (RSD) 72 and mailbox control definition files (MCD)

74. RSD 72 contain information which further specify the manner in which data communications are established and conducted with remotes 16, 18, and 20, in addition to the protocol-oriented coordination information provided by CPD 70. In one embodiment, RSD 72 identifies the remotes 16, 18, and 20 that are authorized to access the processing and storage capabilities of host 12 and identifies operational characteristics of authorized remotes 16, 18, and 20. As used herein, remote 16 refers generally to any remote requesting access to the processing and storage capabilities of host 12.

A separate RSD 72 is associated with each authorized remote 16 according to a mailbox ID associated with the particular remote 16. RSD 72 may include, without limitation, remote protocol information and specifications, protocol enhancement options, remote linetype settings, remote IP addresses, remote phone numbers, remote port numbers, inbound and outbound data format information, ASCII translation file identifiers, outbound data batch separation information, wait interval specifications, directory command format specifications, and any other information suitable for allowing control module 60 to establish data communications sessions between host 12 and remotes 16, 18, and 20. RSD 72 may further specify a password corresponding to each mailbox ID that must be communicated from the particular associated remote 16 before security system 14 approves selected remote access to the processing and storage capabilities of host 12. In one embodiment, control module 60 opens and reads a particular RSD 72 each time a data communications session is established between the remote 16 associated with the particular RSD 72 and security system 14.

Mailbox control definition files (MCD) 74 contain information for controlling the operation of security system 14 to provide remotes 16, 18, and 20 with the selected access to the processing and storage capabilities of host 12. In one embodiment, MCD 74 allows remotes 16, 18, and 20 to add batches of data to data repositories 4, 6, and 8, respectively, if MCD 74 includes a valid mailbox ID corresponding to the particular remote 16, 18, or 20 attempting to add the data batches. MCD 74 may specify, without limitation, system names, administrator passwords, data batch security information limiting inbound data batches to those from remotes having valid mailbox IDs, valid mailbox ID lists, module polling frequency specifications, mailbox maximum data message size settings, exit identifiers and activation information, and other information suitable for allowing control module 61 to provide remotes 16, 18, and 20 with selected access to the processing and storage capabilities of host 12 using mailbox module 62.

Mailbox module 62 is coupled to mailbox engine definition files (MED) 76. In general, MED 76 contain information for configuring the processing and storage capabilities of host 12 to allow security system 14 to add, store, and retrieve data batches from data repositories 4, 6, and 8 in memory 22. MED 76 may specify, without limitation, directory paths, the maximum number of data batches to which system 10 may provide selected access, the minimum number of bytes of freespace to be maintained in memory 22, and any other information suitable for configuring the processing and storage capabilities of host 12 to allow security system 14 to add, store, and retrieve data from data repositories 4, 6, and 8 in memory 22.

Auto connect module 64 is coupled to auto connect definition files (ACD) 78. In general, auto connect module 64 initiates communications between host 12 and remote 16 at predetermined times based on scheduling information in ACD 78 or in response to requests from an operator of host 12. Communications initiated by auto connect module 64 may include, for example, data transfers from host 12 to remote 16, data transfers from remote 16 to host 12, commands from host 12 that cause remote 16 to execute a process, and any other communications between host 12 and remote 16 suitable for automatic initiation using auto connect module 64. In one embodiment, each ACD 78 defines a chronological auto connect list that specifies the remotes 16, 18, and 20 with which auto connect module 64 needs to communicate, the time to communicate, and the task to perform. Each auto connect list may specify a plurality of remotes 16, 18, and 20 that have different associated communications protocols.

ACD 78 may specify, without limitation, remotes with which to establish communications, dates and times at which auto connects are scheduled to be initiated, dates and times at which scheduled auto connects will not be initiated, maximum concurrent remote communications sessions quantities, wait intervals between auto connect session completion and subsequent auto connect session initiation, maximum session inactivity intervals preceding session termination, whether to establish communications with a remote if no data is to be communicated, how many attempts are made to establish communications with a remote, how many times specified resources are requeued for a remote on the auto connect list with which communications are established and delay intervals between requeues, and any other information suitable for automatically initiating communications between host 12 and remote 16. ACD 78 may further specify remote-specific information associated with a particular remote 16 on an auto connect list to replace or override the remote-specific information associated with the particular remote 16 and included in RSD 72.

In operation, security system 14 spawns a separate interactive process 5, 7, or 9 each time, for example, one of the plurality of remotes 16, 18, or 20, respectively, requests access to the processing and storage capabilities of host 12. The selected access of each interactive process 5, 7, or 9 to the processing and storage capabilities of host 12 is limited to its associated data repository 4, 6, or 8, respectively. Interactive processes 5, 7, and 9 interact with remotes 16, 18, and 20, respectively, to provide the selected access.

For example, remotes 16, 18, and 20 may desire to establish communications with host 12 in order to access the particular processing and storage capabilities of host 12 that include memory 22. In response to communications from remotes 16, 18, and 20, security system 14 is operable to use mailbox module 62 to spawn a separate interactive process 5, 7, or 9 to interact with each remote 16, 18, or 20, respectively. Each separate interactive process 5, 7, or 9 has selected access to its associated data repository 4, 6, or 8, respectively, according to its associated remote 16, 18, or 20, respectively. Each separate interactive process 5, 7, or 9 therefore interacts with remote 16, 18, or 20, respectively, to provide remote 16, 18, or 20, respectively, with the selected access to its associated data repository 4, 6, or 8, respectively.

Security system 14 may include one or more application program interfaces (API) to facilitate communications between communications subsystem 50, control module 60, mailbox module 62, auto connect module 64, and exits module 68. In one embodiment, each API is a C function call embedded in an application program associated with security system 14. There may be multiple such application programs. Each application program may communicate with processes operating on host 12 or processes operating remotely from host 12. Each application program may be distributed to operate on multiple processing platforms located within the same or different local area or wide area networks. Each API may be customizable to faciliate data communications to, from, and within security system 14 according to particular needs. The present invention contemplates other suitable methods of facilitating communications within security system 14 and between security system 14 and one or more remotes 16, 18, and 20 using an API.

Although host 12 is shown as a single device, host 12 may include one or more computers that maintain and execute the instructions to implement security system 14. An important technical advantage of security system 14 is the use of communications subsystem 50, control module 60, mailbox module 62, auto connect module 64, log module 66, and exits module 68 running as software processes on security system 14. In one embodiment, security system 14 may therefore be distributed to operate on a plurality of different processing platforms.

Figure 2:
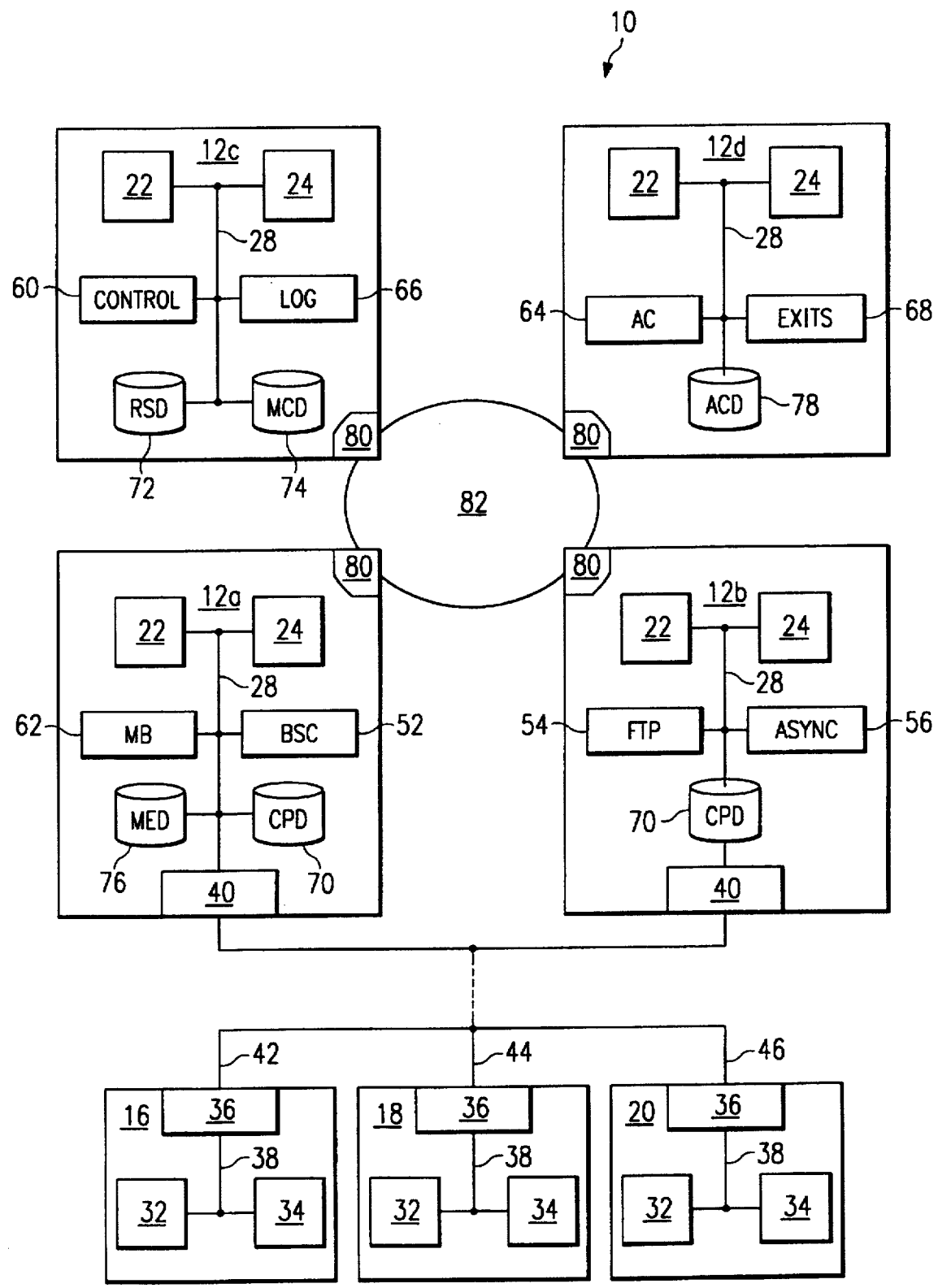
FIG. 2 illustrates a data communication system distributed to operate on a plurality of different processing platforms.

FIG. 2 illustrates a data communications system 10 having a distributed security system 14. Communications from remotes 16, 18, and 20 are received at interfaces 40 coupled to hosts 12a and 12b. Interfaces 40 are operable to communicate data from remotes 16, 18, and 20 to the distributed communications modules 52, 54, and 56 operating on selected hosts 12a and 12b. For example, BSC communications module 52 operates on host 12a, whereas FTP communications module 54 and ASYNC communications module 56 operate on host 12b. Although only hosts 12a, 12b, 12c, and 12d are shown, the present invention contemplates as many hosts 12 as is compatible with the desired distribution of security system 14. Further, although interfaces 40 are shown coupled only to hosts 12a and 12b, the present invention contemplates interfaces 40 coupled to each host 12 on which a communications module 52, 54, or 56 is operating.

Mailbox module 62 and BSC communications module 52, FTP communications module 54 and ASYNC communications module 56, log module 66 and control module 60, and auto connect module 64 and exits module 68 are coupled, respectively, to an interface 80 associated with the host 12 supporting the particular modules. Although mailbox module 62 and BSC communications module 52 are shown running on the same host 12a, FTP communications modules 54 and ASYNC communications module 56 are shown running on the same host 12b, log module 66 and control module 60 are shown running on the same host 12c, and auto connect module 64 and exits module 68 are shown running on the same host 12d, the present invention contemplates any suitable distribution of these modules among two or more hosts 12 in data communications system 10.

Interfaces 80 are coupled to one another using communications network 82, which may include a local area network (LAN), a wide area network (WAN), or any other suitable wireline or wireless network to support data communications among hosts 12a, 12b, 12c, and 12d. In one embodiment, communications network 82 includes a messaging layer that allows communications between hosts 12 that use different communications protocols or provide different processing platforms. For example, the messaging layer of communications network 82 may use Socket Interface Parameter Structures (SIPS) or other suitable message based protocols for communications between hosts 12. In one embodiment, each Socket interface Parameter Structure communicates a separate message between two or more hosts 12 irrespective of platform specific data storage formats. For example, a first host 12 operating on an Intel® data storage format can communicate with a second host 12 operating on a Motorola® data storage format, and a third host 12 that uses a Big Endian data storage format can communicate with a fourth host 12 that uses a Little Endian data storage format.

Using interfaces 80 and communications network 82, communications modules 52, 54, and 56, control module 60, mailbox module 62, auto connect module 64, log module 66, and exits module 68 can be distributed to operate on a plurality of different processing platforms. The increased portability, modularity, and adaptability associated with the distributability of security system 14 provides an important technical advantage of system 10.

Figure 3:
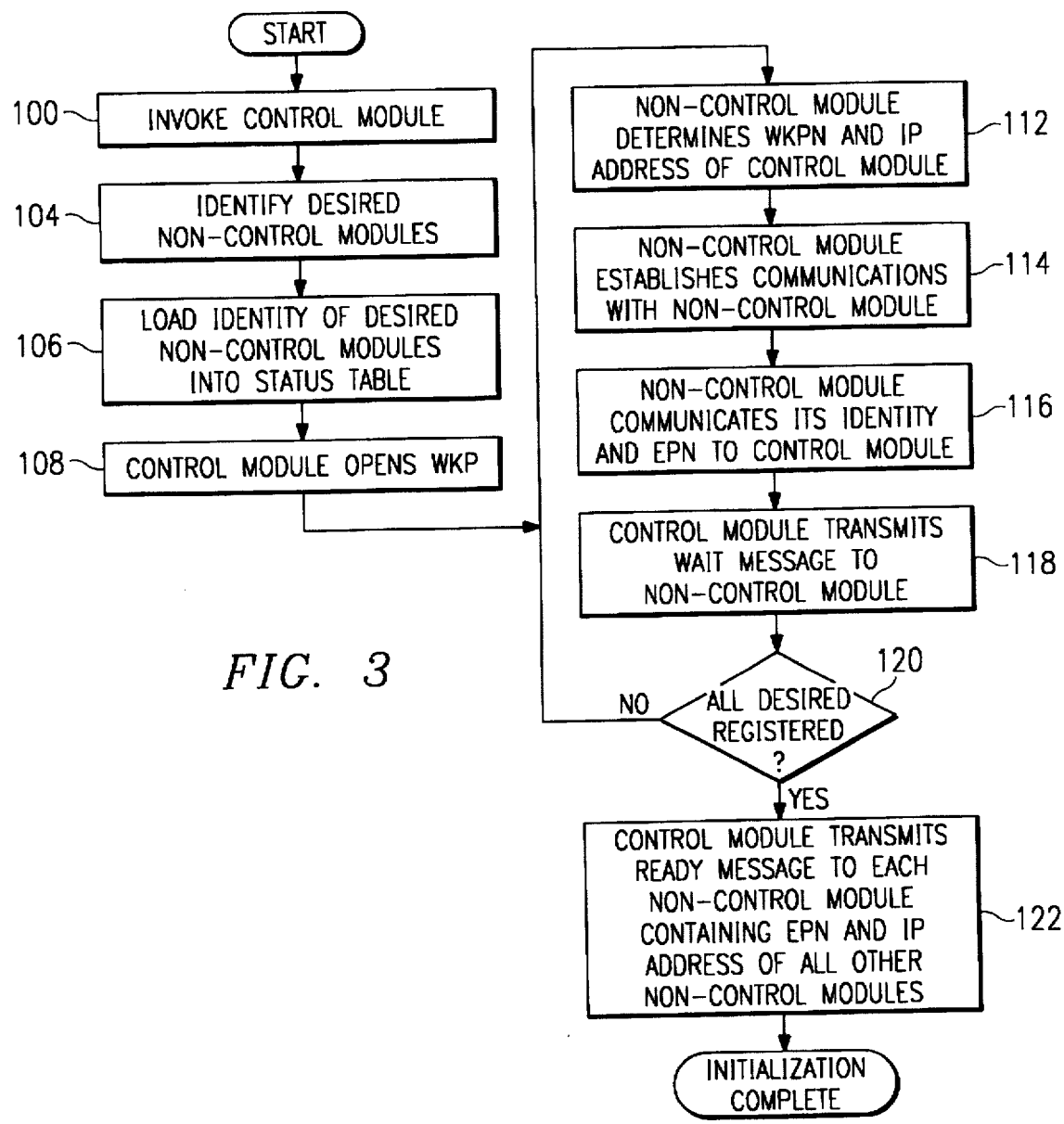
FIG. 3 is a flow chart of a method for initializing a data communication system.

FIG. 3 is a flow chart of a method for initializing the components of security system. The method begins at step 100 where control module 60 is invoked. Control module 60 may be invoked automatically, manually, or in any other manner suitable to initiate the operation of control module 60. At step 104, control module 60 identifies the non-control modules desired to be included in security system 14. The desired non-control modules may include, without limitation, one ore more of the following: communications modules 52, 54, and 56, mailbox module 62, auto connect module 64, exits module 68, and any other processes running on security system 14 that are desirable for data communications and processing. The identities of the desired non-control modules are loaded into a status table at step 106.

Control module 60 opens a well-known port (WKP) at step 108. Any one of the non-control modules determines the well-known port number (WKPN) and Internetwork Protocol (IP) address of control module 60 at step 112, and establishes communications with control module 60 at step 114. At step 116, the non-control module communicates its identity and ephemeral port number (EPN) to control module 60. The ephemeral port of the non-control module allows control module 60 to communicate with the non-control module before the non-control module has established a well-known port. In response to the communications from the non-control module at step 116, control module 60 transmits a wait message to the non-control module at step 118. In one embodiment, the non-control module enters a suspended operating state in response to the wait message and remains in the suspended operating state until a ready message is received from control module 60.

At step 120, control module 60 determines whether all the desired non-control modules have registered with control module 60 in the manner described above in connection with steps 112 through 118. If all the desired non-control modules have not yet registered, steps 112 through 118 are repeated for another non-control module. Steps 112 through 118 are repeated for each successive non-control module identified at step 104 until all the non-control modules have registered with control module 60 by communicating their identities and ephemeral port numbers to control module 60. Although the flow chart shows the non-control modules registering with control module 60 in a serial fashion, the present invention contemplates registration of all the non-control modules simultaneously, or in any other relative order or temporal distribution suitable for effectively initializing the components of security system 14.

After all the non-control modules have registered with control module 60, control module 60 transmits a ready message to each non-control module at step 122. In one embodiment, the ready message contains the ephemeral port numbers and IP addresses of the other non-control modules.

Providing the ephemeral port number and IP address of a particular non-control module to the other non-control modules transforms the ephemeral port of the particular non-control module to a well-known port. Once the ephemeral ports of the non-control modules are transformed to well-known ports, the port number of each non-control module being a well-known port number known by the other non-control modules, initialization of the components of security system 14 is complete.

Figure 4:
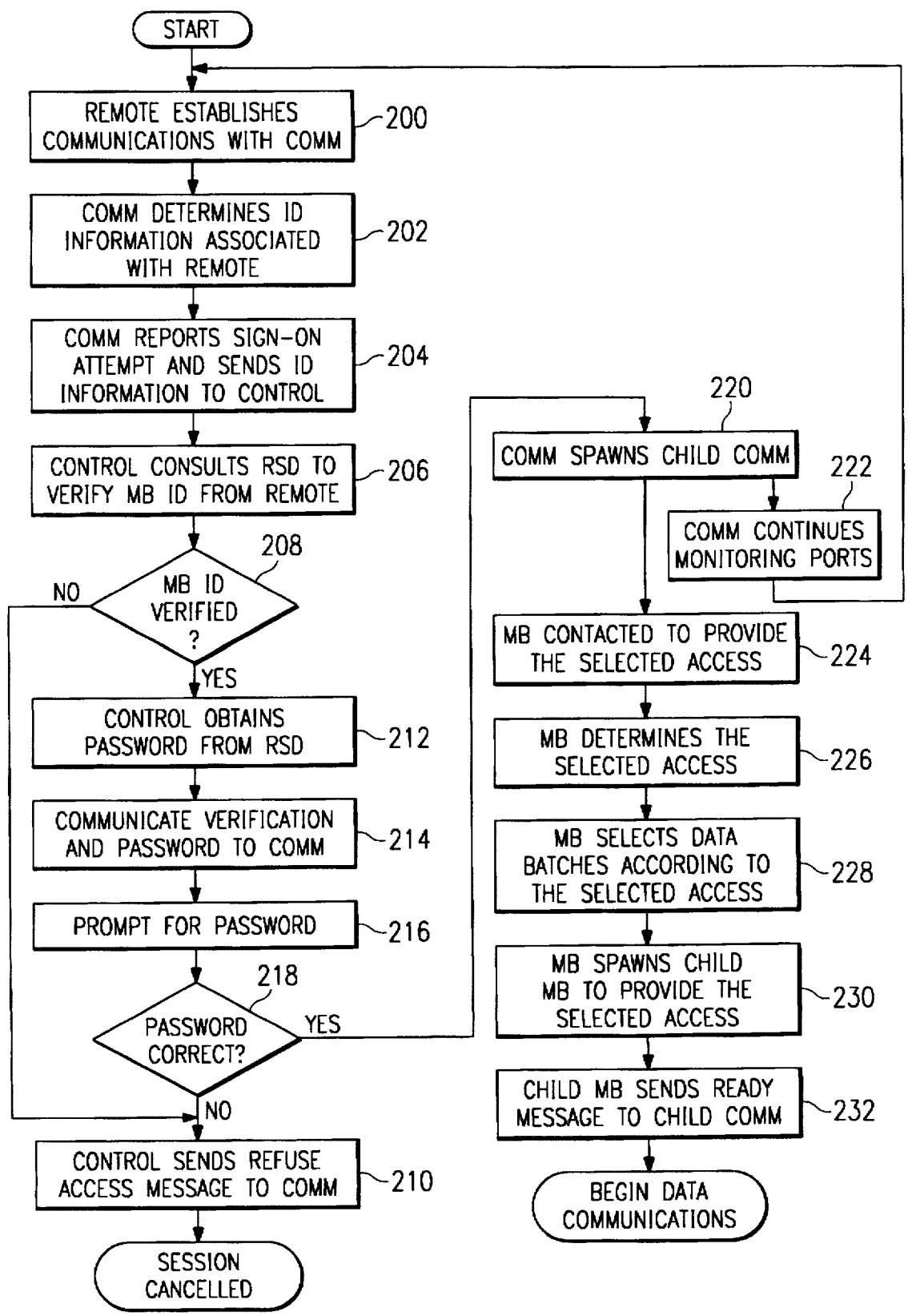
FIG. 4 is a flow chart of a method for establishing a data communications session between a remote and a host using a security system.

FIG. 4 is a flow chart of a method to establish a communication session between remote 16 and host 12 using security system 14. The method begins at step 200 where remote 16 establishes communications with communications subsystem 50. As discussed above in connection with FIGS. 1 and 2, communications subsystem 50 may include a plurality of communications modules 52, 54, and 56, each having a different associated communications protocol. Further, communications modules 52, 54, and 56 may be distributed to run on a plurality of different processing platforms. As used herein, communications module 52 refers generally to any one of the plurality of communications modules 52, 54, and 56.

Communications module 52 determines identification information associated with remote 16 at step 202. Identification information may include a username, password, mailbox ID, or any other information suitable to identify or authorize remote 16. Identification information may be determined either non-interactively or interactively. Whether communications module 52 determines the identification information non-interactively or interactively may depend upon the particular communications protocol used for communications between remote 16 and host 12. In one embodiment, remote 16 is interactively prompted to communicate a mailbox ID associated with remote 16 to communications module 52. Communications module 52 reports the remote sign-on attempt and communicates the identification information to control module 60 at step 204.

In response to the communications from communications module 52 at step 204, control module 60 attempts to verify that remote 16 has communicated a valid mailbox ID to communications module 52 and is authorized to access the processing and storage capabilities of host 12 that are associated with the particular mailbox ID. In one embodiment, control module 60 consults RSD 72 to verify the mailbox ID at step 206. If the mailbox ID communicated by remote 16 does not match the mailbox ID associated with remote 16 and contained in RSD 72, control module 60 transmits a refuse access message to communications module 52 at step 210 and communications between remote 16 and host 12 are canceled.

If the mailbox ID from remote 16 matches the mailbox ID associated with remote 16 in RSD 72, control module 60 retrieves the password associated with the matched mailbox ID using RSD 72 at step 212. At step 214, control module 60 communicates the verification of the mailbox ID to communications module 52, along with the associated password. For communications sessions using an interactive communications protocol, such as file transfer protocol (FTP), communications module 52 then prompts remote 16 to communicate the associated password at step 216.

If the password communicated by remote 16 does not match the password associated with remote 16 retrieved from RSD 72, control module 60 transmits a refuse access message to communications module 52 at step 210 and communications between remote 16 and host 12 are canceled. If remote 16 communicates the correct associated password at step 218, which matches the password retrieved from RSD 72 at step 212, communications module 52 spawns a child communications module to manage data communications between remote 16 and host 12 at step 220. In one embodiment, the spawned child communications module is a separate process, application, or instantiation of communications module 52.

After spawning the child communications module, communications module 52 continues to monitor its associated communications ports at step 222. Repeating steps 202 through 220, communications module 52 may spawn a separate child communications module each time one of a plurality of remotes 16, 18, and 20 contacts communications module 52 and is authorized to access selected processing and storage capabilities of host 12 by control module 60. Although the flow chart shows each remote 16, 18, and 20 contacting security system 14 in a serial fashion, the present invention contemplates communications with remotes 16, 18, and 20 simultaneously, or in any other relative order or temporal distribution suitable for establishing data communications sessions between remotes 16, 18, and 20 and host 12.

Mailbox module 62 is contacted at step 224 in order to provide remote 16 with selected access to the processing and storage capabilities of host 12 according to the identification information associated with remote 16. In one embodiment, mailbox module 62 accesses data repositories 4, 6, and 8 in memory 22 to store data in individual batches identified by batch ID. Mailbox module 62 tracks the data batches using an indexed control file in which one control file record exists for each data batch stored in data repositories 4, 6, and 8. The control file may be tracked and indexed, for example, according to a batch number associated with each data batch, a batch ID associated with each data batch, which may include a user-supplied description of the batch contents, a mailbox ID, a combination of batch number, batch ID, and mailbox ID, or in any other manner suitable for tracking and indexing the batches of data in data repositories 4, 6, and 8.

At step 226, mailbox module 62 determines the selected portion of the processing and storage capabilities of host 12 that remote 16 is authorized to access. Remote 16 may be authorized, for example, to access only particular data batches and file directories. In one embodiment, mailbox module 62 associates each batch ID with a particular mailbox ID using the indexed control file. One mailbox ID may have one or more associated batch IDs depending upon the particular implementation. The batch IDs associated with a particular mailbox ID correspond to the data batches in memory 22 accessible by the remote 16 having the particular mailbox ID.

Mailbox module 62 specifies the data batches in memory 22 that are accessible by remote 16 at step 228. In one embodiment, the particular data batches accessible by each remote 16, 18, or 20 are selectively differentiated from the remaining data batches in memory 22 to provide data repositories 4, 6, and 8, respectively. The selected access of each particular remote 16, 18, or 20 to the processing and storage capabilities of host 12 is then limited to the data batches in data repositories 4, 6, and 8, respectively. At step 230, mailbox module 62 spawns a child mailbox module to interactively provide remote 16 with the selected access in accordance with the mailbox ID associated with remote 16. In one embodiment, the spawned mailbox module is a separate process, application, or instantiation of mailbox module 62. After spawning the child mailbox module, mailbox module 62 may spawn additional child mailbox modules each time security system 14 is to provide one of a plurality of remotes 16, 18, and 20 with selected access to the processing and storage capabilities of host 12. The child mailbox module sends a ready message to the child communications module at step 232, indicating that data communications between remote 16 and host 12 may begin in accordance with the selected access remote 16 has to the processing and storage capabilities of host 12.

Figure 5A:
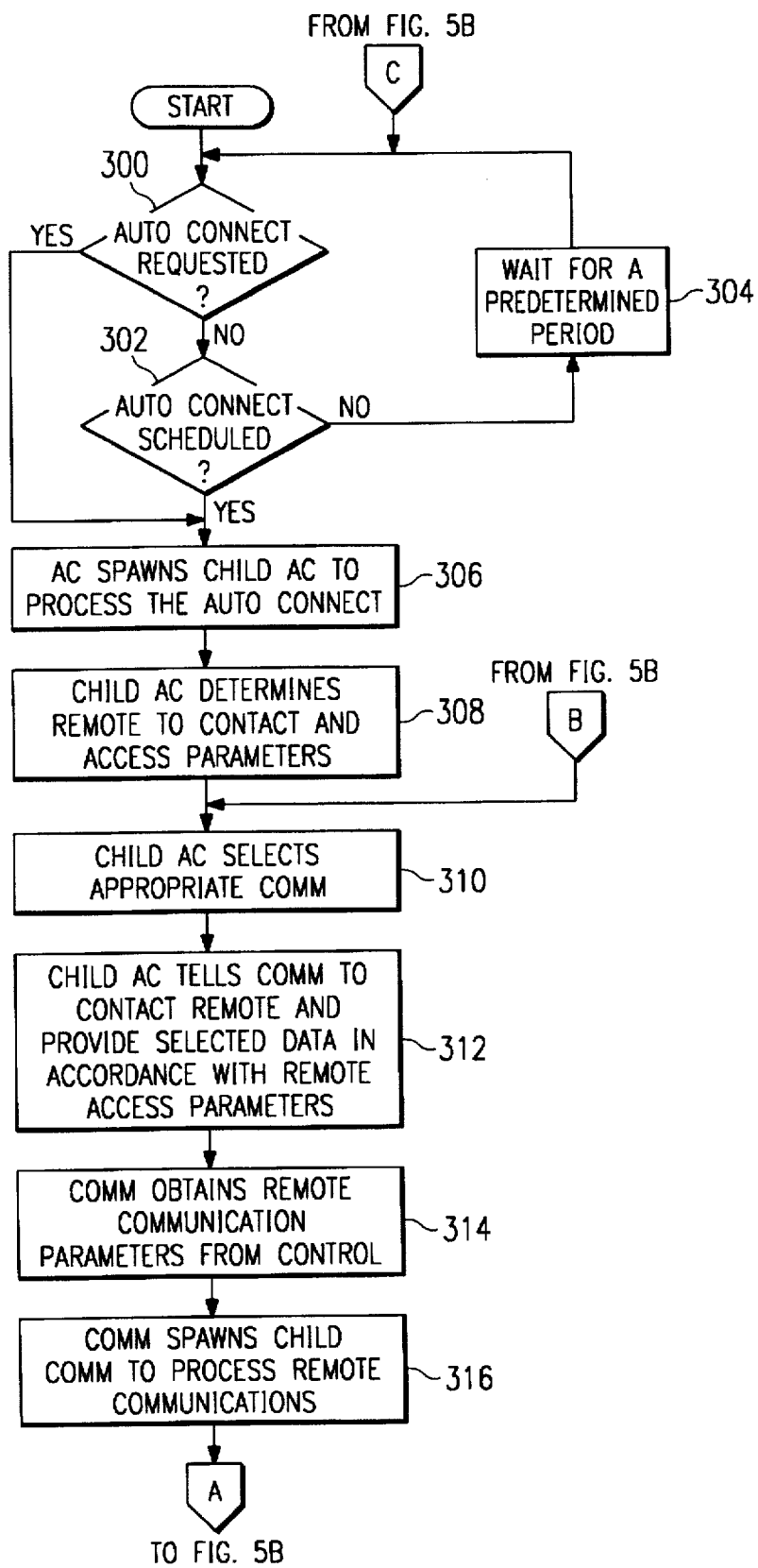
FIG. 5A and FIG 5B are flow charts of a method for initiating automatic data communications in a data communication system.
Figure 5B:
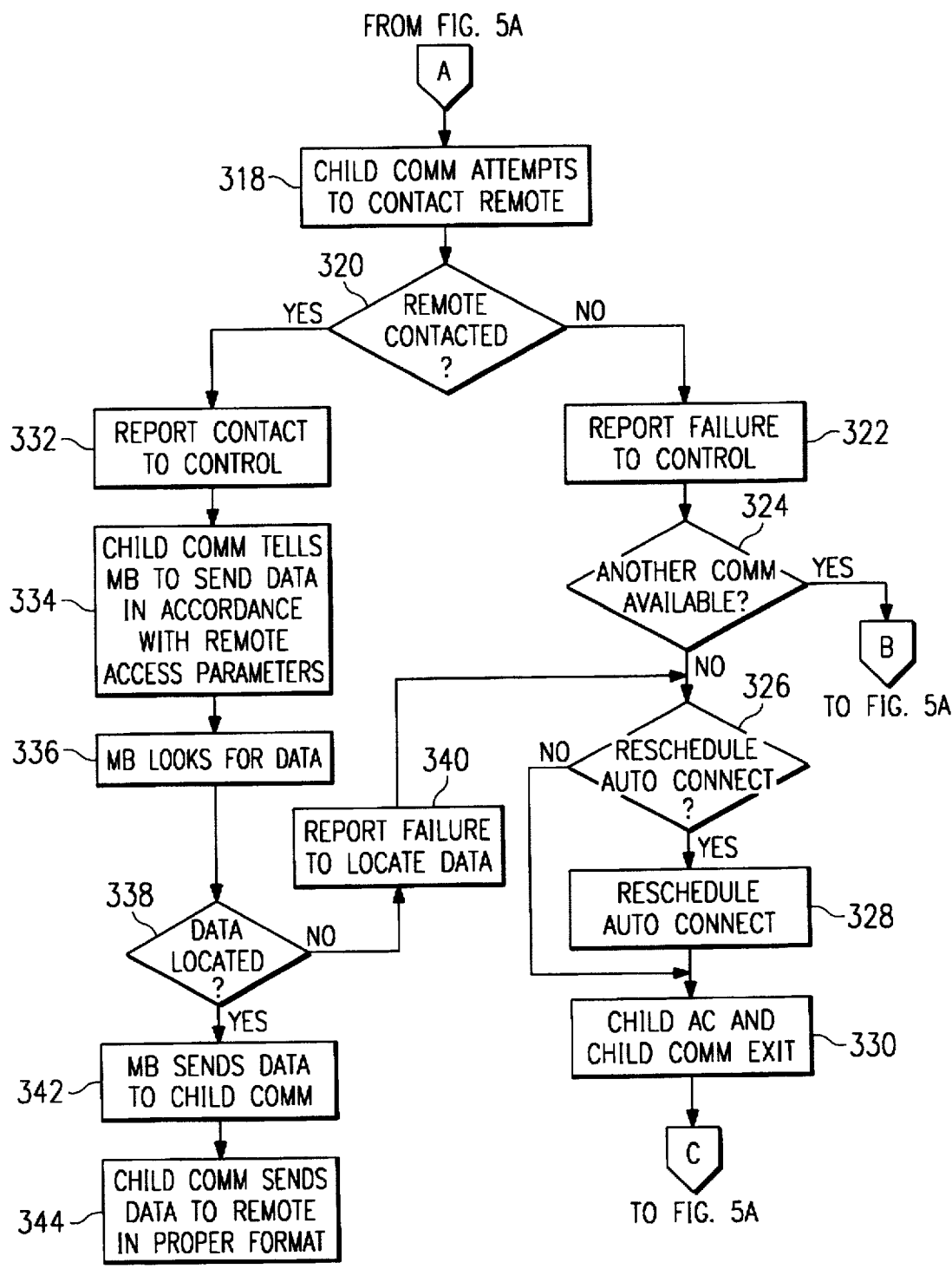

FIG. 5 is a flow chart of a method for establishing an auto connect data communications session between host 12 and remote 16. The method begins at step 300, where an auto connect may be requested. Auto connect requests may be initiated manually by a system administrator or operator, automatically by host 12 or security system 14 in response to some other event, or in any other suitable manner. If an auto connect has not been requested, the method proceeds to step 302, where it is determined whether an auto connect has been scheduled to occur at that predetermined time. If an auto connect has not been scheduled, security system 14 waits for a predetermined period at step 304 before returning to step 300. If an auto connect has been requested at step 300 or scheduled at step 302, auto connect module 64 spawns a child auto connect module to manage the auto connect at step 306.

At step 308, the child auto connect module consults ACD 78 to determine the remote 16 to contact, the time to contact remote 16, and the task to be performed. In one embodiment, each ACD 78 defines a chronological auto connect list specifying a plurality of remotes 16, 18, and 20 to contact, the time to contact remotes 16, 18, and 20, and the task to be performed. ACD 78 may further specify remote-specific information associated with a particular remote 16 on an auto connect list to replace or override the remote-specific information associated with the particular remote 16 and included in RSD 72. The child auto connect module selects an appropriate communications module 52, 54, or 56 to communicate with remote 16 at step 310 using information contained in RSD 72 coupled to control module 60, ACD 78, or both RSD 72 and ACD 78. At step 312, the child auto connect module tells communications subsystem 50 to establish communications with remote 16 and to provide remote 16 with selected data. In one embodiment, the selected data provided to a particular remote 16 is contained in data repository 4 associated with the particular remote 16, and specified in accordance with the mailbox ID associated with the particular remote 16.

Communications module 52 obtains remote communication parameters from RSD 72 coupled control module 60, ACD 78, or both RSD 72 and ACD 78 at step 314. Communications module 52 then spawns a child communications module to process communications between host 12 and remote 16 at step 316. At step 318, the child communications module attempts to contact remote 16 using the appropriate protocol and communications parameters. If remote 16 is not contacted at step 320, the method proceeds to step 322 where the failure is reported to control module 60.

If remote 16 supports another communications protocol and another appropriate communications module 52, 54, or 56 is available at step 324, the method returns to step 310. Steps 312 through 320 are then repeated using the selected alternate communications module 52, 54, or 56. If another appropriate communications module is not available, auto connect module 64 determines whether an auto connect session should be rescheduled at step 326. If appropriate, the auto connect session is rescheduled at step 328, and the child auto connect module and the child communications module terminate processing at step 330. If an auto connect session is not to be rescheduled at step 326, the method proceeds directly to step 330 where the child auto connect module and the child communications module terminate processing. Whether or not an auto connect session is rescheduled, the method returns to step 300.

If communications are established with remote 16 at step 320, the successful contact is reported to control module 60 at step 332. At step 334, the child communications module requests mailbox module 62 to retrieve selected data from memory 22 and to communicate the selected data to remote 16. Although establishing an auto connect session with remote 16 is discussed in the context of communicating data from host 12 to remote 16 using security system 14, the present invention contemplates establishing auto connect sessions to communicate data from remote 16 to host 12 or any other processing platform coupled to security system 14, to request remote 16 to execute a process on itself, host 12, or any other processing platform coupled to security system 14, or to perform any other task suitable for automatic initiation using auto connect module 64.

After the child communications module tells mailbox module 62 to communicate the selected data at step 334, mailbox module 62 searches memory 22 for the appropriate data batches using the indexed control file at step 336. Mailbox module 62 may perform this task or may spawn a child mailbox module to perform this task, as described above in connection with FIG. 4. If the selected data batches are not located at step 338, the failure is reported at step 340. The method then returns to step 326, where the auto connect may be rescheduled. If mailbox module 62 locates the appropriate data batches at step 338, mailbox module 62 communicates the selected data to the child communications module at step 342. The child communications module then communicates the selected data to remote 16 in a format appropriate for remote 16 at step 344.

Figure 6:
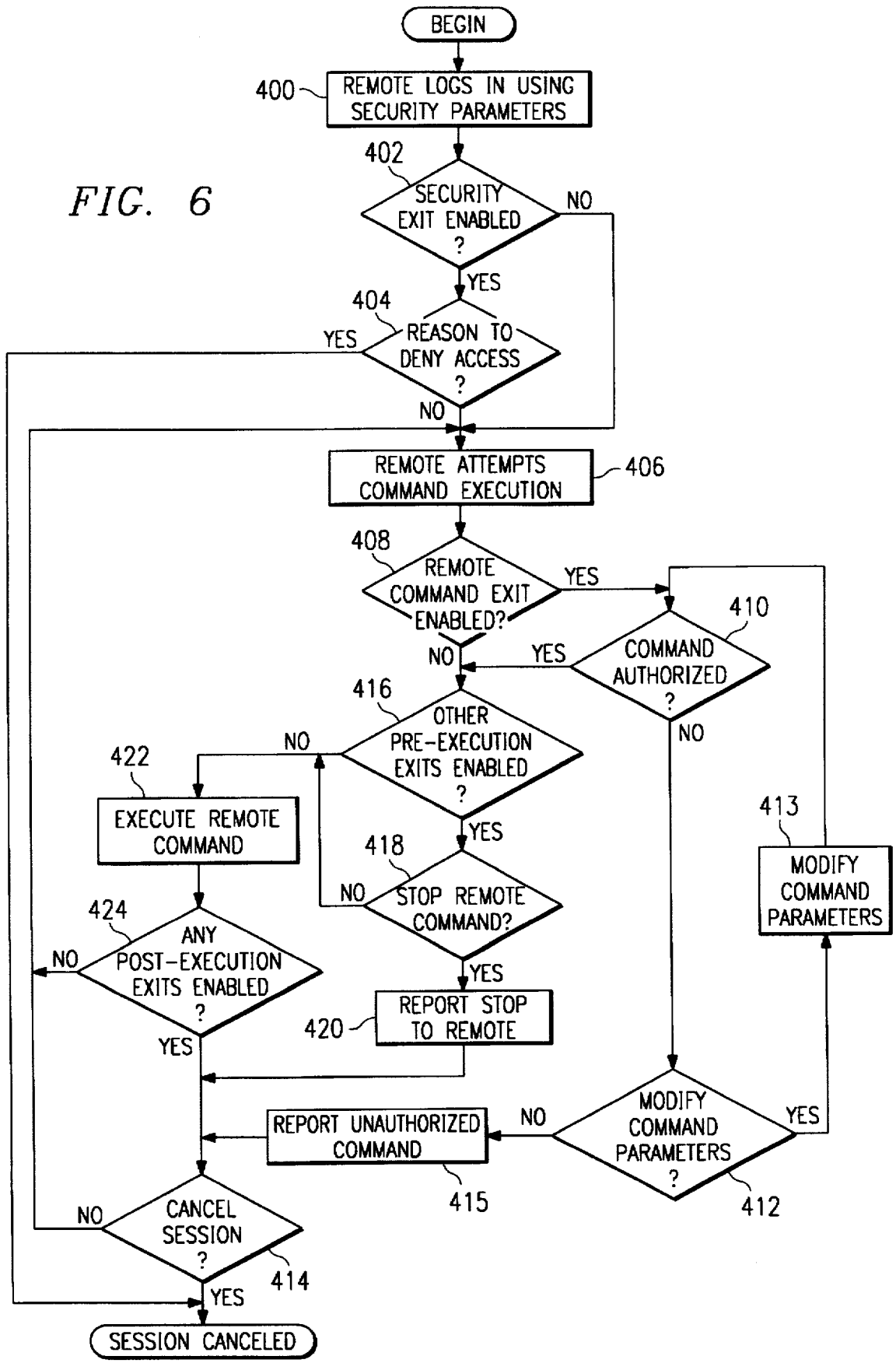
FIG. 6 is a flow chart of a method for implementing system exits in a data communication system.

FIG. 6 is a flow chart of a method for implementing user-supplied exits before and during the data communications session between remote 16 and host 12, using exits module 68. In general, exits module 68 is coupled to control module 60 and may modify access by remote 16 to the processing and storage capabilities of host 12 in response to communications from remote 16. In one embodiment, MCD 74 specifies which exits are enabled at any particular time and for any particular remote 16.

The method begins at step 400 where remote 16 successfully signs on using identification information particular to remote 16. Identification information may include, for example, a username, a mailbox ID, a password, or any other identification information associated with remote 16. If the security exit is enabled at step 402, the method determines at step 404 whether there is any reason to deny remote 16 access to the processing and storage capabilities of host 12, despite remote 16 having successfully signed on at step 400. Reasons to deny remote 16 access may include, for example, past or present payment delinquencies, past attempts to execute unauthorized or invalid commands, and any other past or present condition making it desirable to deny remote 16 access to the processing and storage capabilities of host 12 despite remote 16 having successfully signed on at step 400. If there is a reason to deny remote 16 access, the session is canceled. If there is no reason to deny remote 16 access, the method proceeds to step 406 where remote 16 attempts to execute a command. If the security exit is not enabled at step 402, the method proceeds directly from step 402 to step 406.

If the remote command exit is not enabled at step 408, the method proceeds directly to step 416. If the remote command exit is enabled, exits module 68 determines whether the command remote 16 attempted to execute was authorized at step 410. If the remote command was not authorized, exits module 68 determines at step 412 whether to modify command parameters associated with the remote command so as to place the remote command in an authorized condition. Exits module 68 may modify command parameters associated with a remote command to add data to memory 22, for example, in response to exits module 68 recognizing that the data is incompatible with the access remote 16 has to memory 22. If the remote command parameters are to be modified, the remote command parameters are modified at step 413 and the method returns to step 410, where it is again determined whether the remote command is authorized. If the remote command parameters are not to be modified, the method determines whether or not to cancel the session at step 414. If the session is not canceled, the user is informed of the unauthorized command at step 415, and the method returns to step 406, where remote 16 must attempt to execute another command.

If the remote command is authorized at step 410, whether as initially communicated or as modified at step 413, other pre-execution exits may be enabled at step 416. Although the other pre-execution exits are discussed in connection with step 416, these other pre-execution exits may be invoked before or after the security exit and/or the remote command exit are invoked or otherwise initiated. Other pre-execution exits may include, without limitation: an initialization exit specifying whether control module 60 invokes an exit in response to its initialization processing; a session initiation exit specifying whether communications subsystem 50 invokes an exit in response to a data communications session being established with remote 16; and any other exit suitable to modify access by remote 16 to the processing and storage capabilities of host 12 before a remote command is executed. If other pre-execution exits are enabled, the remote command may be stopped at step 418 and the stop reported to remote 16 at step 420. The method then proceeds to step 414 to determine whether or not to cancel the session. As discussed above, the session may either be canceled or the method may return to step 406, where remote 16 must attempt to execute another command.

If the remote command is not stopped at step 418, the remote command is executed at step 422. If any post-execution exits are enabled at step 424, the method proceeds to step 414 to again determine whether or not to cancel the session. As discussed above, the session may either be canceled or the method may return to step 406, where remote 16 must attempt to execute another command. If no post-execution exits are enabled, the method proceeds directly from step 424 to step 406. Post-execution exits may include, without limitation: a batch receive exit specifying whether mailbox module 62 invokes an exit in response to receiving a data batch from remote 16 or otherwise adding a data batch to memory 22; a batch send exit specifying whether communications subsystem 50 invokes an exit in response to successful communication of a data batch to remote 16; a data input exit specifying whether communications subsystem 50 invokes an exit in response to data being received from remote 16; a data output exit specifying whether communications subsystem 50 invokes an exit in response to data being communicated to remote 16; a session termination exit specifying whether communications subsystem 50 invokes an exit before data communications between remote 16 and host 12 are terminated; a termination exit specifying whether control module 60 invokes an exit during shutdown of system 10; an application program interface (API) function exit specifying whether the API invokes an exit before an operation requested by a command line utility or user-written API is executed; and any other exit suitable to modify access by remote 16 to the processing and storage capabilities of host 12 once a remote command has been executed.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A data communications system, comprising:
   a remote associated with one of a plurality of users, the remote operable to communicate data;
   a host coupled to the remote and having a memory, the host operable to communicate data with the remote;
   a plurality of data repositories within the memory of the host, each data repository associated with a particular user; and
   a security system coupled to the remote and the host, the security system operable to spawn an executable program in response to the remote requesting access to the host, the executable program having selected access to the memory of the host, the executable program operable to interact with the remote to provide the selected access, the selected access comprising access to the data repository associated with one of the plurality of users.

2. The system of claim 1, wherein the security system is operable to establish a separate executable program each time one of a plurality of remotes requests access to the host, each executable program having an associated remote, each executable program having selected access to the memory of the host.

3. The system of claim 1, wherein the security system spawns the executable program according to access information associated with the one of the plurality of users, the access information specifying the selected access.

4. The system of claim 3, wherein the access information comprises a mailbox identifier associated with the one of the plurality of users.

5. The system of claim 1, wherein the security system is distributed to operate on a plurality of different processing platforms.

6. The system of claim 1, wherein the security system further comprises:
   a communication module operable to receive communications from the remote and to transmit an access signal in response; and
   a mailbox module operable to spawn the executable program in response to the access signal.

7. The system of claim 6, wherein the mailbox module spawns the executable program according to access information associated with the one of the plurality of users, the access information specifying the selected access.

8. The system of claim 6, wherein the communications module comprises a protocol converter operable to receive first data from the remote in a first protocol and translate the first data into second data in a second protocol, the protocol converter operable to communicate the second data to the host in the second protocol.

9. A security system for providing selected access to a memory of a host, comprising:
   a communications module coupled to a remote and the host, the remote being associated with one of a plurality of users, the communications module operable to receive communications from the remote and to transmit an access signal in response;

a control module coupled to the communications module, the control module operable to receive the access signal and, in response, to approve selected access to the memory of the host, the memory of the host comprising a plurality of data repositories, each data repository associated with a particular user, the control module operable to transmit a spawn signal in response to approving the selected access; and a mailbox module coupled to the control module, the mailbox module operable to receive the spawn signal and to spawn an executable program in response, the executable program having the selected access to the memory of the host and operable to interact with the remote to provide the selected access, the selected access comprising access to the data repository associated with the one of the plurality of users.

10. The system of claim 9, wherein the security system is operable to establish a separate executable program each time one of a plurality of remotes requests access to the host, each executable program having an associated remote, each executable program having selected access to the memory of the host.

11. The system of claim 9, wherein the mailbox module spawns the executable program according to access information associated with the one of the plurality of users, the access information specifying the selected access.

12. The system of claim 9, further comprising an exits module coupled to the control module and operable to modify the selected access in response to commands communicated from the remote.

13. The system of claim 9, further comprising a remote site definitions file coupled to the control module and associated with the remote, the remote site definitions file operable to specify communications parameters for establishing communications between the remote and the host.

14. The system of claim 9, further comprising:

an auto connect definitions file specifying communications to be established at predetermined times between the security system and the remote; and an auto connect module coupled to the control module and operable to initiate communications between the security system and the remote at the predetermined times specified in the auto connect definitions file.

15. The system of claim 14, wherein the communications between the security system and the remote comprise a command operable to cause the remote to execute a program.

16. The system of claim 14, wherein the communications between the security system and the remote comprise information operable to override remote-specific information associated with the remote.

17. The system of claim 9, further comprising an exits module coupled to the control module and operable to modify parameters associated with a remote command if the command is incompatible with the selected access.

18. The system of claim 9, further comprising an exits module coupled to the control module and operable to determine a reason to deny the one of the plurality of users the selected access.

19. The system of claim 9, further comprising an exits module coupled to the control module and operable to invoke an exit selected from the group consisting of:

an exit invoked in response to initialization of the system;

an exit invoked in response to a communications session being established with the remote;

an exit invoked in response to receiving data from the remote;

an exit invoked in response to the addition of data to the memory of the host;

an exit invoked in response to communicating data to the remote;

an exit invoked during shutdown of the system; and an exit invoked in response to a request to execute an operation.

20. A method of data communications, comprising:

receiving communications from a remote at a host having a memory, the remote being associated with one of a plurality of users, the memory comprising a plurality of data repositories, each data repository associated with a particular user;

approving selected access to the memory of the host in response to the communications from the remote, the selected access comprising access to the data repository associated with the one of the plurality of users;

transmitting a spawn signal in response to approving the selected access; and spawning an executable program in response to the spawn signal, the executable program operable to interact with the remote to provide the selected access.

21. The method of claim 20, wherein a separate executable program is established each time access by one of a plurality of remotes is approved, each executable program having an associated remote, each executable program having selected access to the memory of the host.

22. The method of claim 20, wherein spawning the executable program determines the selected access to the memory of the host, the selected access specified by access information associated with the one of the plurality of users.

23. The method of claim 20, wherein receiving the communications from the remote at the host comprises:

receiving first data from the remote in a first protocol;

translating the first data into second data in a second protocol using a protocol converter; and communicating the second data to the host in the second protocol.

24. The method of claim 20, further comprising:

establishing communications between the remote and a communications module coupled to the host in response to receiving the communications from the remote;

spawning a child communications module to manage communications with the remote; and reporting the communications from the remote to a control module, the control module operable to approve the selected access.

25. A method of initializing a data communications system, comprising:

coupling a plurality of non-control modules to a control module, the non-control modules operable to determine a well-known port number for the control module;

communicating ephemeral port numbers for the non-control modules to the control module using the well-known port for the control module; and communicating a ready signal from the control module to each of the non-control modules to initialize the data communications system, the ready signal having the ephemeral port numbers for each of the non-control modules.

26. The method of claim 25, further comprising:

loading the identities of the non-control modules into a status table.

27. The method of claim 25, wherein the non-control modules comprise a communications module and a mailbox module.

* * * * *